Dec. 18, 1945.  R. A. LAKE  2,391,056
KEYBOARD PERFORATOR
Filed Feb. 22, 1943  4 Sheets-Sheet 1

INVENTOR
ROSS A. LAKE
BY J.H.B. Whitfield
ATTORNEY Dec. 18, 1945.  R. A. LAKE  2,391,056
KEYBOARD PERFORATOR
Filed Feb. 22, 1943  4 Sheets-Sheet 2

INVENTOR
ROSS A. LAKE
BY J. H. B. Whitfield
ATTORNEY

Dec. 18, 1945.  R. A. LAKE  2,391,056
KEYBOARD PERFORATOR
Filed Feb. 22, 1943   4 Sheets-Sheet 3

INVENTOR
ROSS A. LAKE
BY J. H. B. Whitfield
ATTORNEY

Dec. 18, 1945.          R. A. LAKE                2,391,056
                    KEYBOARD PERFORATOR
              Filed Feb. 22, 1943          4 Sheets-Sheet 4

INVENTOR
ROSS A. LAKE
BY *J. H. B. Whitfield*
ATTORNEY

Patented Dec. 18, 1945

2,391,056

UNITED STATES PATENT OFFICE 2,391,056

KEYBOARD PERFORATOR

Ross A. Lake, Oak Park, Ill., assignor to Teletype Corporation, Chicago, Ill., a corporation of Delaware Application February 22, 1943, Serial No. 476,693

10 Claims. (Cl. 164—112)

This invention pertains to perforating apparatus and more particularly to apparatus for the perforation of a tape identifying telegraphic messages, said perforator being associated with a sensing means to transmit impulses by the holes perforated.

Transmission of character identifying signals in telegraph systems is frequently achieved in accordance with a control strip including control indicia formed in varying combinations either by manual or tape control, which may be either local or distant. Specifically, the control indicia may be in the form of transverse rows of perforations formed in a tape either by a keyboard perforator or by a signal controlled perforator which is commonly referred to as a reperforator. The tape thus prepared, to control correspondingly the transmission in succession of impulses identified with the perforations, passes through a transmitter or sensing mechanism, which has its tape entrance channel separated from the tape exit channel of the perforator. Under such conditions, a short length of tape extends between the perforator and the transmitter and contains a group of perforations, whose last character perforated is not sensed unless the tape is advanced to present such group of perforations to the transmitter or unless the sensing mechanism is made movable along the control strip to sense the last control indicia and effect transmission of its corresponding signal impulses, as disclosed in Patent No. 2,262,012, granted November 11, 1941 to R. A. Lake.

The principal object of the present invention is to provide a code perforating apparatus wherein the perforating mechanism is susceptible of movement along the tape under certain operating conditions.

Another object of the invention is to provide a perforating device which may be employed in conjunction with a transmitting apparatus whereby the perforating instrumentalities are movable along the tape so that the last code perforated in the tape is immediately transmitted by the transmitting device.

The above and other objects of the invention are accomplished by the provision either of a manually operated keyboard perforator or a signal controlled perforator operative in conjunction with a tape sensing mechanism including a plurality of sensing fingers set permutably in accordance with the perforations or control indicia in a previously prepared control strip to control the transmission of impulses symbolic of the characters to be reproduced. The perforator to which the invention has been specifically applied comprises a plurality of key levers arranged to set permutably a plurality of bars which, in turn, set correspondingly a plurality of interponents to control, upon the operation of a mechanically operated punch hammer, the operation of punches arranged in a transverse row to perforate the control strip in accordance with the code allocated to a depressed key lever. The perforating instrumentalities of the perforating device according to this invention are arranged to be pivoted so that the perforating punches may be advanced toward the transmitting device in order that the last code perforated may be immediately transmitted by the transmitting device.

Cooperating with the code punches is a feed hole punch for inserting in the tape in advance of the code perforations a feed hole which cooperates with a tape feeding mechanism of the perforating unit to advance the tape therethrough step by step in order that the groups of perforations therein may be punched successively.

The perforating mechanism includes, as previously indicated, punches or punching elements which are mounted in a carrier capable of oscillation about a fixed pivot away from and toward the entrance channel of a tape transmitter. Normally, the tape entrance channel of the sensing unit of a transmitter is immediately adjacent or contiguous to the exit channel of the perforator and the tape passes directly from the perforator to the sensing unit without any exposed portion of the tape. When the perforator is operated, the tape feed mechanism thereof advances the tape and causes the perforating unit to be pushed or pivoted a distance equal to the distance between the transverse rows of perforations, thus starting a transmitting distributor which includes means to move the tape in the sensing unit, but since the tape may be perforated at a greater rate of speed than it is transmitted, the perforator is pivoted away from the sensing mechanism until it reaches a predetermined back stop, whereupon a loop of tape is created between the perforator and the transmitter. When the perforating operations are terminated and a loop of tape exists between the perforator and the transmitter, the transmitter continues to transmit the signals under the control of the tape while the tape is advanced through the transmitter until the tape is taut between the transmitter and perforator whereupon the tape draws or pulls the perforator toward the transmitter until the perforator is again contiguous to the transmitting mechanism, and when the last signal perforated in the tape has been transmitted, transmission will cease automatically.

A feature of the present invention consists in providing in the tape perforating mechanism of the pivoted type, a novel back spacing mechanism of the rectilinear (as described in Lake Patent No. 2,262,012) type. Heretofore, as shown in the aforementioned Lake patent, the tape feeding operation has been performed through the instrumentality of a so-called reciprocatory pivoted or "rectilinear" feed mechanism. The signification of "rectilinear" herein is as embraced in the aforesaid U. S. Patent No. 2,262,012. The tape advancing mechanism shown in the Lake patent includes elements operated cyclically under the control of cams, constituting a part of the transmitting cam distributor drum, according to a rectilinear action. In the perforating device, according to the present invention, a corresponding rectilinear action is provided for advancing the tape through the perforator. In addition to this, a reversing mechanism is provided wherein the tape feeding cams are adjusted so as to operate the rectilinear operating mechanism in a reverse direction to back space the tape through the perforating device.

A better understanding of the invention may be had from the following description taken in conjunction with the accompanying drawings, wherein.

Figures 1, 2:
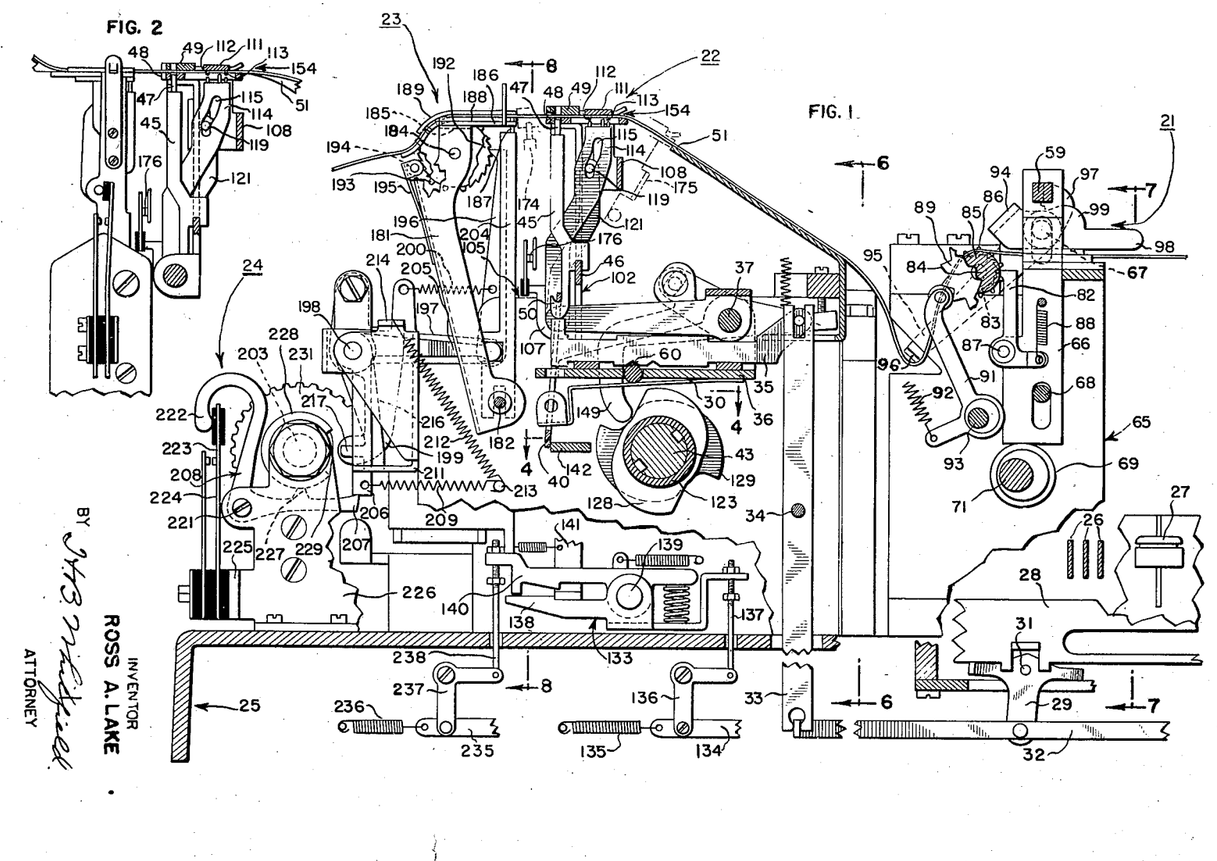
Fig. 1 is a front elevational view, partly in section, of the structure according to the invention.
Fig. 2 is a fragmentary elevational view showing the pivoted perforator of the present invention associated with the pivoted transmitter of Lake Patent No. 2,262,012.

Having reference to Fig. 1, the structure according to the present invention may be considered as including the following principal units; namely, a pre-punch feed hole mechanism 21, a pivoted perforator 22 for perforating code holes in transverse rows on the record strip, a tape sensing unit 23, and a transmitting unit 24. Each of the several units is mounted on a base casting 25. In the specific embodiment of the invention disclosed, the perforating mechanism is indicated as being keyboard operated or controlled. The keyboard mechanism employed is of the type shown in R. A. Lake et al. Patent No. 1,969,891 and comprises a plurality of key levers 26 provided at their outward extremities with keytops 27 arranged in a key bank.

Beneath the key levers 26 is arranged a series of pairs of code bars 28 adapted to be operated vertically so that when, upon depression of a key lever 26, one of the key bars 28 of the pair will be depressed while its companion bar will be raised or elevated. Associated with each of the pairs of bars 28 and carried on a pivot shaft 31 is a rocker member 29 which is arranged to cooperate with the bars 28, as described in the aforementioned Lake et al. patent, so that the rocker arms 29 will be rocked either clockwise or counterclockwise by the bars 28, depending upon the permutation code allotted to the particular key lever operated. Pivotally articulated to the depending arm of the rocker member 29 (of which there is one located at each end of the bar 28) is a link member 32. Each of the link members 32 extends leftwardly (as in Fig. 1) beyond the rocker member 29, and is pivotally articulated to the lower end of a punch interponent operating lever 33, which is one of a series of levers pivoted on a shaft 34, suitably journaled in the apparatus. It is understood, of course, that there are a number of pairs of bars 28 corresponding to the permutation code employed; for example, in the present disclosure a five-unit permutation code is contemplated. Hence, there are five pairs of permutation code bars 28 and five links 32, as well as five interponent operating levers 33. As disclosed in the aforementioned R. A. Lake et al. Patent No. 1,969,891, there is also associated with the plurality of code bars 28 a universal bar (not shown) which is adapted to be depressed or operated upon each depression of the key lever 26 to initiate the operation of the perforating apparatus, as will presently appear.

Figures 6, 7, 8, 9, 10:
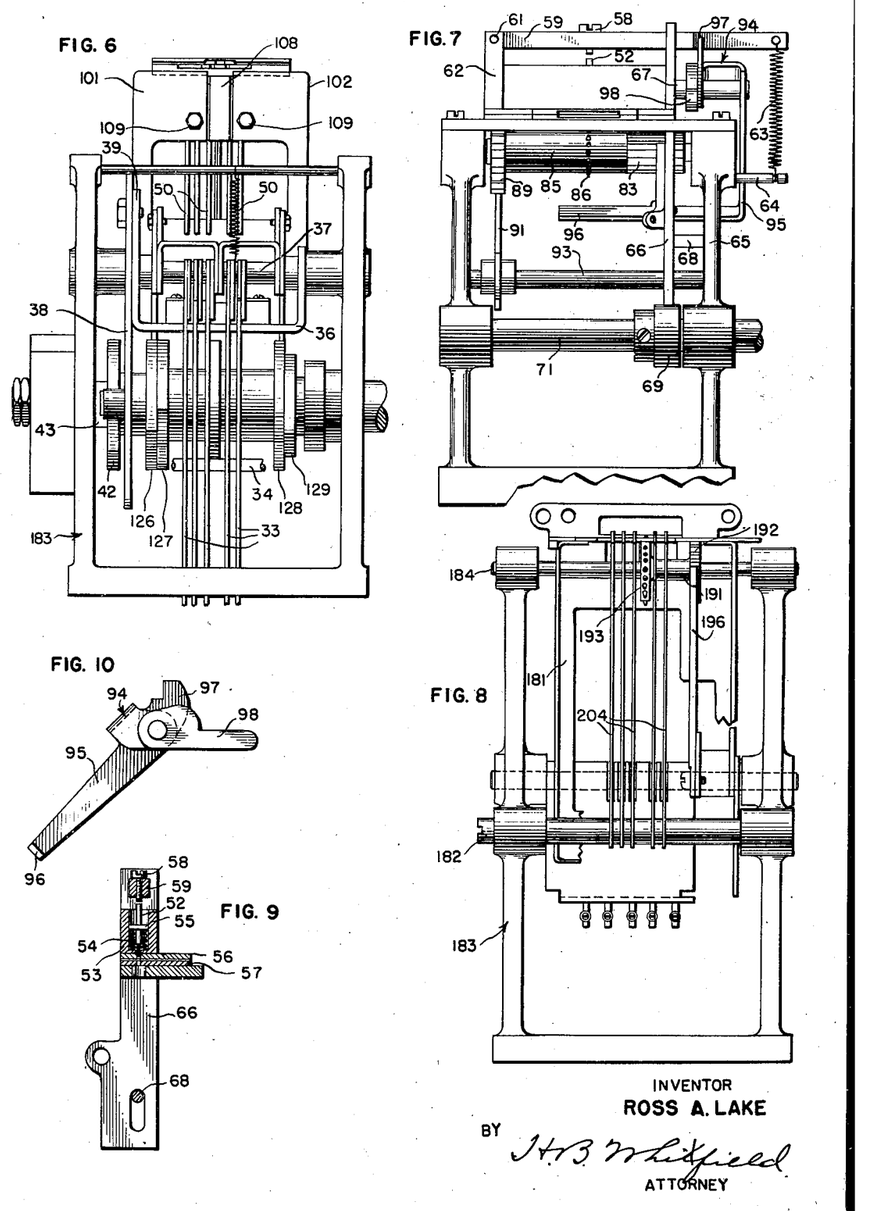
Fig. 6 is a sectional view taken on line 6—6 of Fig. 1.
Fig. 7 is a sectional view taken on line 7—7 of Fig. 1.
Fig. 8 is a sectional view taken on line 8—8 of Fig. 1.
Fig. 9 is a vertical sectional view taken through the feed punch mechanism.
Fig. 10 is a detailed view of the taut tape lever for the feed-hole punch mechanism.
Figure 14:
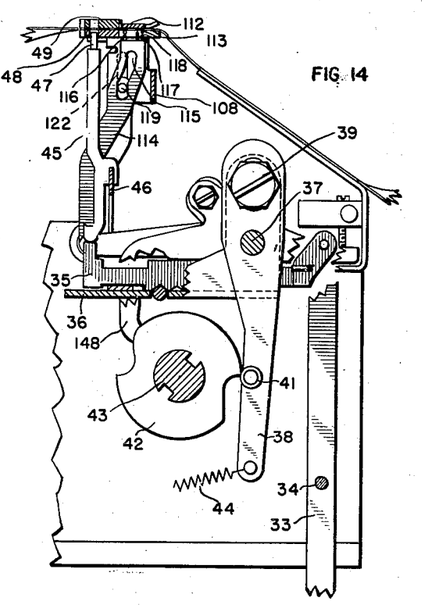
Fig. 14 is a vertical sectional view of the perforating mechanism.

Each of the levers 33 is pivotally associated at its upper end with an interponent member 35 which is slidably carried in the actuating member or hammer 36 pivotally carried on shaft 37. As shown in Figs. 6 and 14, the hammer 36 is actuated about the pivot shaft 37 by means of the operating lever 38 which is also pivotally mounted on the shaft 37 and which is adjustably attached to the hammer 36 through the instrumentality of the vertical portion 39 (Fig. 6). Arm 38 carries a follower roller 41 which cooperates with the perforator operating cam 42, carried on a sleeve member 123 mounted on main shaft 43. It will be noted that the cam 42 has two similar cam contours so that the perforator is operated once for each one-half revolution of the cam. As will be presently described, the structure herein disclosed is adapted to operate in such a manner that the cam rotates one-half revolution upon each depression of the key lever, hence the two similar cam contours on each cam. The follower roller 41 is held in contact with the periphery of the cam 42 by means of a spring 44 which tends to bias the lever 38 normally in a clockwise direction.

Figure 11:
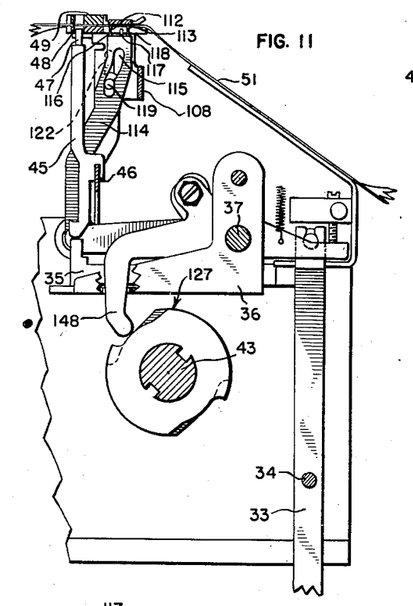
Fig. 11 is a vertical sectional view of the rectilinear feed operating mechanism.

Each interponent 35 is, at its free end, adapted to cooperate with the bottom end of an associated punch member 45 (Figs. 1, 11 and 14). As will presently appear, the bottom end of the punch member 45 which cooperates with the interponent 35 is arcuate so that the point of contact between the punch member 45 and the interponent 35 is coincident with the pivot center of the pivoted perforator 22. The relation between the guide 46 and punch member 45 is such that the punch members 45 are held in proper cooperative relation with interponents 35. The punch members 45 are reciprocated vertically, and are conformed to slide on guide members 46. Each of the punch members 45 is provided at its upper end with a cylindrical punch element 47, which is movable through an opening in a guide plate 48 and coperates with a die plate 49. The plates 48 and 49 are spaced apart to form a tape guide for the tape 51.

Thus, upon the operation of a key lever 26, the permutation bars 28 are set according to the permutation code combination allotted to the operated key lever, and the rocker arms 29 are operated either clockwise or counterclockwise according to the vertical motion of the bars 28, as described in the R. A. Lake et al. Patent No. 1,969,891, whereupon the links 32 are reciprocated rightwardly or leftwardly to correspond with the code combination set up in the bars 28. The levers 33 are set either in a clockwise or counterclockwise position by the links 32 to set or position the interponents 35 in their rightward or leftward positions, bringing the left end of the interponents either into the path of or out of the path of the vertically operating punch members 45, so that when the punch hammer or actuating member 36 is operated through the instrumentality of cam 42 and lever 38 (Fig. 14), the interponents 35 are rocked clockwise (as viewed in Fig. 1) to raise the punch members 45, if an interponent is positioned therebeneath, to cause a perforation to be made in the tape 51.

Secured to the bottom surface of punch actuating member 36 is a spring member 39 which is formed at its free end to carry a yoke member 40 which spans projections 50 of the punch members 45. Yoke member 40 thus serves as a yieldable punch stripping instrumentality. Carried in the member 36 beneath each interponent 35 is a ball 60 which cooperates with a pair of V-shaped notches in the bottom edge of its associated interponent. The balls 60 are pressed against the interponents by the spring member 39 to provide a detent means to hold the interponents 35 in their set position.

As previously mentioned, the structure disclosed comprises a pre-punch mechanism 21 wherein the feed holes are punched in the tape 51 at a point in advance of the code-hole perforator 22. As shown in Fig. 9, a feed-hole punch 52 is partially enclosed in a housing 53 which conceals a spring 54 arranged to subject punch 52 to spring tension to restore it to its normal position. Punch 52 is guided in housing 53 by enlarged integral flange portion 55 and is further guided in guide plate 56 and cooperates with a die plate 57. In the embodiment disclosed, the feed punch 52 is operated through the instrumentality of an adjustable screw 58, disposed in vertical alignment with punch 52 and carried in a bar 59 pivoted at 61 on a member 62. As viewed in Fig. 7, bar 59 extends rightwardly and has connected at its extremity one end of a spring 63, the other end of which is secured to a spring post 64, attached to the frame 65. Substantially intermediate the screw 58 and spring 63 (Fig. 7) is a yoke member 66 which engages the bar 59 and is slidable vertically on studs 67 and 68. Yoke member 66 cooperates with an eccentric cam 69 fixed to an operating shaft 71 journaled in frame 65.

Shaft 71 rotates continuously and carries at its end a gear 72 (Fig. 3), which meshes with a pinion gear 73 fixed to a cross shaft 74, journaled in bearings 75 and 76 mounted on the base 25. Continuous rotation is imparted to the cross shaft 74 through a gear 77 which is meshed with a pinion gear 78 carried on shaft 79 of a motor 81. Accordingly, the yoke member 66 reciprocates vertically in a continuous manner, and carried on the yoke member 66 is a tape feeding pawl 82 which cooperates with a feed ratchet 83 fixed to shaft 84 mounted in the frame 65. In the present embodiment, the ratchet 83 comprises teeth cut in a sleeve 85 (Figs. 3 and 7) which also carries integral therewith a peripheral series of tape feeding pins 86. The pawl 82 is normally biased in a counterclockwise direction about stud 87 by a spring 88. In this manner, the pawl 82 is normally in engagement with the ratchet 83 so that upon each upward movement of the yoke 66, the ratchet 83 (and therefore, sleeve 84) is rotated counter-clockwise, as viewed in Fig. 1, one angular step to thereby step the tape leftwardly from one perforating position to the next. Also fixed to the sleeve 85 is a star wheel 89, and cooperating therewith is a detent member 91 which is spring biased in a counterclockwise direction, by a spring 92 about a shaft 93.

Figures 3, 4, 5:
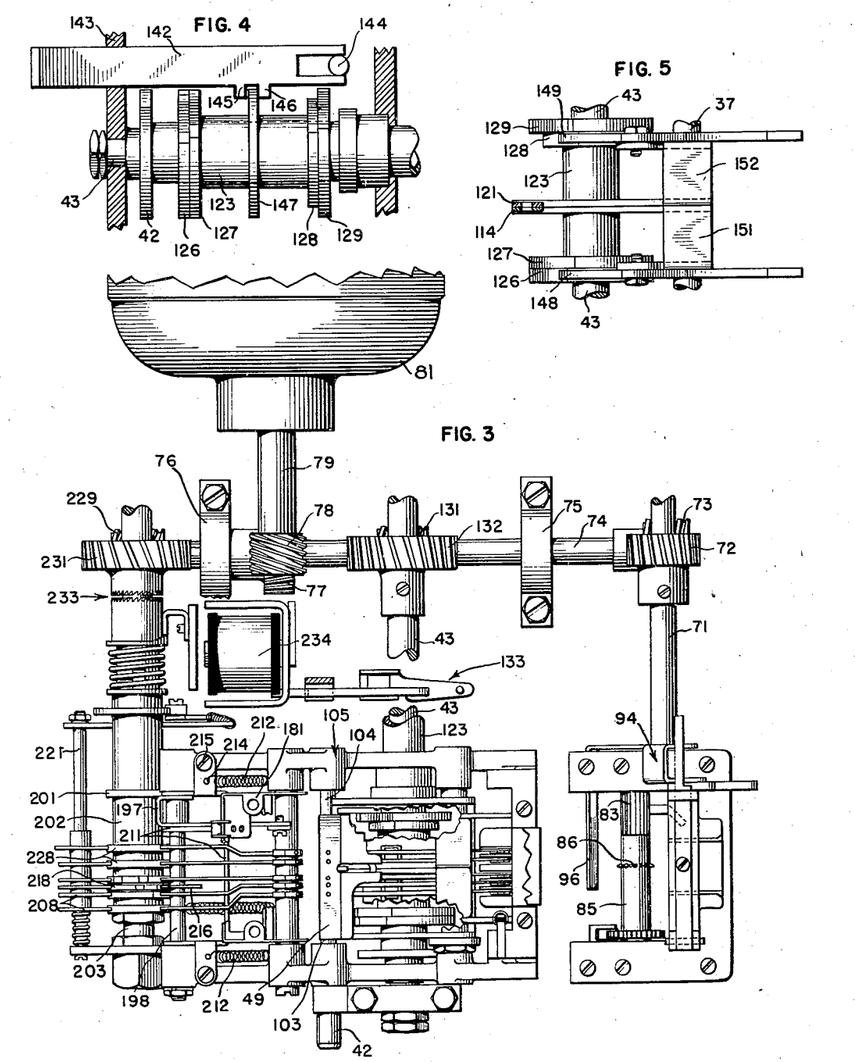
Fig. 3 is a plan view of the structure disclosed in Fig. 1.
Fig. 4 is a sectional view taken on line 4—4 of Fig. 1 to show the back space shift mechanism.
Fig. 5 is a top view of the rectilinear feed operating mechanism.

As previously mentioned, the production of feed holes in the tape is continuous since the shaft 71 has been indicated as continuously rotating. However, to prevent too great an amount of tape from being perforated with feed holes in the event that the perforation of code holes is not keeping pace therewith, the control device shown in Fig. 10 is provided. Having reference to Figs. 1, 3, 7, and 10, there is loosely mounted on the shaft 67, a lever, generally indicated as 94, which comprises a downwardly and leftwardly directed arm 95 having a lateral portion 96 of sufficient length to span the entire width of the tape 51 (Fig. 3). As shown in Fig. 1, the tape 51, after passing over the sleeve or feed roller 85, is directed downwardly underneath the lateral portion 96, then upwardly toward the code perforator 22. As the loop of tape is formed between the feed hole punch and the code hole punch, the lever 94 is permitted to rotate in a counterclockwise direction, thus bringing the shouldered portion of extension 97 into latching engagement with the bar 59, as shown in Fig. 1. When this relation between lever 94 and bar 59 exists, the bar 59 and yoke 66 can no longer respond to the pull of spring 63 and thus the reciprocal movement of the yoke 66 is suspended or prevented. Then when the loop of tape is taken up, and the tape becomes taut, the lever 94 will be rotated by the tape in a clockwise direction about the shaft 67, so that the extension 97 becomes disengaged from the bar 59, thereby permitting further reciprocation of the yoke 66 and consequent perforation of feed holes in the tape. A lever arm 98 is also pivotally mounted on shaft 67 and is provided with a cam portion 99 which acts, upon counterclockwise rotation of lever 98, to cam or raise bar 59 upwardly, causing bar 59 to pivot about the pin 61 for the purpose of manually suppressing the operation of bar 59.

According to the present invention, the perforator unit 22, as previously mentioned, is pivoted. The perforator unit (Fig. 6) includes two frame members 101 and 102, pivoted on pivot pins 103 and 104 (Fig. 3) in a manner to permit free oscillation of the perforator unit. Pins 103 and 104 are secured in bracket 105 mounted on base 25, and cooperate with lateral portions 106 and 107 of frame members 101 and 102. As shown in Figs.

1, 3, and 6, the frame members 101 and 102 are joined together near their upper edge by a U-shaped member 108 which is attached to members 101 and 102 by screws 109 (Fig. 6). Carried jointly by frame members 101 and 102 are the die plate 49 and the punch guide plate 48.

Figure 12:
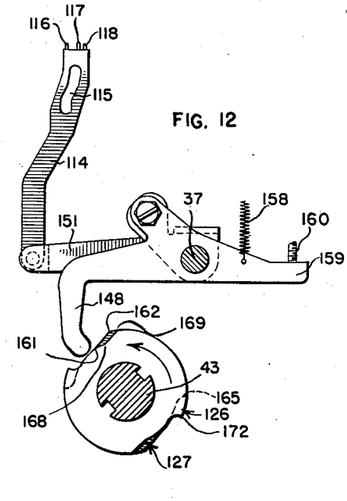
Figs. 12 and 13 are separate views showing the component elements of the rectilinear feed mechanism and the operating cams therefor.

Secured to plate 49 by a screw is a reed spring 111 which carries at its free end two pins 112 and 113 (Fig. 2) which cooperates with the rectilinear feed mechanism, as will appear hereinafter. Within the space formed by the metallic spacer 108, is a slidably movable member 114 which is formed with a cam groove 115 (Figs. 1 and 12) and which carries on its upper extremity pins 116, 117, and 118. Pins 116 and 118 are of the same length, but pin 117 is considerably longer than pins 116 and 118, the purpose of which will appear more clearly hereinafter. Cooperating with the cam groove 115 is a pin 119, secured to the free end (Fig. 13) of arm 121 articulated on cam operated lever arm 152. Pin 119 extends from both sides of arm 121, a length sufficient to permit it to travel in vertical slots 122 in the member 108 (Figs. 1, 11, and 12).

As will be described more fully hereinafter, member 114 and arm 121 are operated in timed relation. Arm 121 is drawn upwardly in the slots 122 and when so drawn and due to the particular shape of cam groove 115, member 114 will be moved to the left (as viewed in Figs. 1, 11, and 14), and relative movement between the punch elements and the tape 51 will be effected. Member 114 then is moved downwardly to withdraw pins 116, 117, and 118 from engagement with the feed perforations already perforated in the tape 51. Following this action, arm 121 is moved downwardly, and due to the afore-mentioned camming action between pin 119 and groove 115, member 114 is moved rightwardly. The member 114 is thereafter elevated to cause the pins 116, 117, and 118 to engage other feed perforations in the tape 51 to achieve, on a subsequent cycle, relative movement between the perforating elements 45 and the perforated tape 51.

Figure 13:
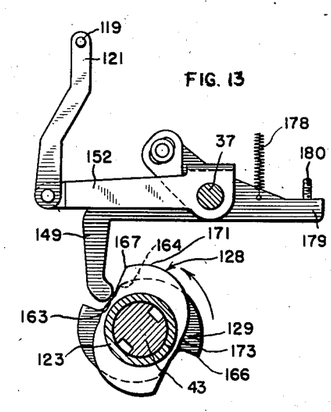

Mounted on shaft 43 and slidable with respect thereto in an axial direction is a cam sleeve 123 (Fig. 4). The afore-mentioned cam 42 (Fig. 14) for operating the punch hammer 36 is integrally associated with sleeve 123. Moreover, a series of cams 126, 127, 128, and 129, identified with the rectilinear feed mechanism of the pivoted perforating unit are also integrally associated with the cam sleeve 123. Cams 126 and 127, as more clearly shown in Fig. 12, are associated with the arm 114 of the rectilinear feed mechanism, and cams 128 and 129 are associated with the arm 121, as shown in Fig. 13.

As previously mentioned, the electric motor 81 has on its shaft a pinion gear 78 which meshes with a gear 77 fixed to a cross shaft 74. Shaft 74 has fixed thereon a pinion 131 which meshes with a gear 132 fixed to shaft 43 associated with the perforating mechanism.

Shaft 43 carries thereon, adjacent the clutch trip mechanism indicated generally as 133 in Figs. 1 and 3, a combination switch and positive clutch (not shown) of the type and construction illustrated in Figs. 5 and 7 of the aforementioned Lake Patent No. 2,262,012. Upon depression of any of the key levers 26, the code bars 28 will be operated, as will be the universal bar (not shown) to effect the operation of the clutch release mechanism 133. For example, upon the depression of the universal bar, a link 134 connected thereto is operated rightwardly against the tension of a spring 135 to cause the counterclockwise rotation of a bell crank 136. The counterclockwise rotation of bell crank 136 causes a link 137 to be elevated to cause the counterclockwise rotation of elements 138 and 140 of the clutch release mechanism 133 about shaft 139. In this manner, the stop projection on element 138 is removed from the path of a spring operated latch 141 to effect the application of power, through the friction and positive clutch mechanism, to the cam sleeve 123. The form of clutch release mechanism shown herein corresponds to that disclosed in Patent No. 2,019,505 to A. H. Reiber of November 5, 1935, and consequently reference may be had to such patent for a full and complete understanding of the construction and operation of the release mechanism which is operated by the universal bar upon the depression of any of the key levers 26.

As set forth in said Reiber patent, the clutch release mechanism 133 is normally operative through link 137 to effect a single operative cycle, and hence is called a non-repeat clutch release mechanism. Briefly, this is achieved by the offset relation of the confronting stop shoulders on elements 138 and 140, so that in the event a key lever is held depressed, the shoulder on element 140 will be effective upon latch 141 to arrest rotation after one cycle. Another feature of the present invention is to provide a means for causing repetition of the operating cycle. This is accomplished through the instrumentality of a link 235 associated with the repeat key (not shown), which, when operated, causes the link 235 to be operated rightwardly against the tension of a spring 236 to cause counterclockwise rotation of a bell crank 237. The counterclockwise rotation of bell crank 237 causes a link 238 to be elevated to cause the clockwise rotation of element 140 to hold the shoulder thereon out of operative relation with the element 141. To effect a repeat operation, the links 137 and 138 are caused to be elevated simultaneously, either by operating two keys concurrently; namely, a character key and the repeat key; or if desired, bell crank 237 and a bell crank with its link, comparable to bell crank 136 with its link 137, may both be connected to link 235 so that both elements 138 and 140 are operated by a single key.

According to the present invention, a "rectilinear" feed means is provided in which forward spacing of the tape is controlled by a pair of cams 127 and 129, and back spacing of the rectilinear feed mechanism is effected through the instrumentality of a pair of cams 126 and 128, provision being made for shifting the cam sleeve 123 manually by means of a shift bar 142, shown in Fig. 4. Shift bar 142 is guided for slidable operation in wall 143 of the frame and the pin 144, cooperating with the open slotted end of bar 142. Bar 142 is provided with a pair of lugs 145 and 146 which straddle a disc 147 integral with sleeve 123. Thus, as the bar 142 is reciprocated rightwardly and leftwardly as viewed in Fig. 4, the cam sleeve, through the articulation of lugs 145 and 146 with the disc or flange 147, will cause the sleeve 123 to be reciprocated correspondingly.

Assuming that the bar 142 is in its leftward position, as viewed in Fig. 4, to effect forward spacing of the tape, cams 127 and 129 will cooperate with follower levers 148 and 149, respectively (Figs. 1, 12, and 13). Lever 148 is pivotally mounted on shaft 37 and is adjustably connected to a lever arm 151 also pivotally mounted on the shaft 37 (Figs. 5 and 12). Pivotally articulated to the arm 151 at its free end is the rectilinear feed member 114.

Likewise follower lever 149 is pivotally mounted on shaft 37 and is adjustably connected to a lever arm 152 also pivotally mounted on shaft 37 (Figs. 5 and 13). Pivotally carried at the free end of arm 152 is the afore-mentioned operating lever 121 of the rectilinear feed mechanism.

Lever 148 is normally biased counterclockwise by a spring 158 (Fig. 12) to hold its arm 159 against an adjustable stop 160. Likewise, lever 149 is normally biased counterclockwise by a spring 178 (Fig. 13) to hold its arm 179 against an adjustable stop 180. With this arrangement, the stops 160 and 180 are so adjusted as to provide a slight clearance between follower levers 148 and 149 and their respective pairs of cams, when said cams are in their rest or normal stop positions, as shown in Figs. 1, 12, and 13, to permit the cam sleeve 123 to be readily shifted to control forward and backward spacing of the tape 51, as will appear hereinafter.

As previously mentioned, the cams on shaft 43 are each provided with two similar cam peripheries, since the cam sleeve is arranged to make one-half revolution for each complete cycle of operation of the perforator 22. Therefore, during each one-half revolution of cam sleeve 123, a perforating operation is completed, followed in the same cycle by a single tape stepping operation of the rectilinear feed mechanism. As indicated in the drawings, the cams are shown in their stop position. Having reference to Fig. 11, the tape feed element 114 of the rectilinear feed mechanism is shown in its normal stop position. The tape feed member 114 normally is held in its position shown in Fig. 11, wherein the member 114 is in its withdrawn position; that is, with the pins 116, 117, and 118 withdrawn from the tape and with the member 114 in its rightward position. For forward feeding or stepping of the tape 51, the tape feed member 114 is first elevated to bring the pins 116 and 118 into engagement with the feed holes in the tape and at the same time pin 117 operates to lift the detent member 111. The member 114 is then operated leftwardly in its elevated position to advance the tape one space, whereafter it is lowered to bring the pins out of engagement with the tape, and then the member 114 is moved rightwardly in its lowered position back to the normal position shown in Fig. 11. As previously mentioned, the members 114 and 121 are operated in timed relation for forward spacing by cams 127 and 129. Also, the members 114 and 121 are operated in timed relation for back spacing by cams 126 and 128, as will hereinafter appear.

Die plate 49 and guide plate 48 are each provided with aligned open ended slots 153 (Fig. 3) within which the rectilinear tape feeding member 114 is operative. The plates 48 and 49 are flared at the entrance end 154 to facilitate admission of the tape 51 (Fig. 1). Secured to plate 49 by a screw is a reed spring 111 which carries at its free end two pins 112 and 113, Fig. 1, which align vertically with pins 116 and 118, respectively, when the member 114 is in its rightward position. As previously mentioned, pins 116 and 118 are of the same length and cooperate with pins 112 and 113. As disclosed in Figs. 1 and 11, pin 117 is substantially longer than pins 116 and 118 and thus will engage the under surface of reed spring 111 and move it about its pivot to free pins 112 and 113 from the feed perforations in tape 51. Pin 117 having engaged a feed perforation prior to the engagement of pins 116 and 118 with feed perforations and prior to the disengagement of pins 112 and 113 from the feed perforations, tape 51 will be held against accidental displacement and will be maintained in proper alignment with the punch elements 47. Also, when member 114 is lowered and pins 116 and 118 are moved free of feed perforations in the tape, and prior to the engagement of pins 112 and 113 with the feed perforations corresponding to those previously engaged by pins 112 and 113, respectively, pin 117 will prevent the displacement of tape 51. Such a construction insures also that the feed perforations will not be mutilated, and also insures that the tape will be properly spaced between successive code perforations to enable the transmission of signals corresponding to the setting of the punch elements 47.

The withdrawal of pins 116, 117, and 118 from the feed perforations, the upward stroke of arm 121, and the reinsertion of pins 116, 117, and 118 in feed perforations are achieved by their respective cams during the perforation of the holes in accordance with the code combination of impulses indicative of the setting of the punch elements 47.

Since the rectilinear action is substantially the same as that disclosed in Lake Patent No. 2,262,012, reference may be had to Figs. 9 to 12, inclusive, of said patent for a disclosure of the various positions of the rectilinear feed mechanism through which the perforated tape is advanced. Specifically, starting from the normal position of arm 114, which is the downward and rightward position as shown in Fig. 11, arm 114 is moved, for forward spacing, upwardly by its cam 127 (represented by that portion of the cam periphery between points 161 and 162, Fig. 12) to bring pins 116, 117, and 118 into engagement with the feed holes in tape 51 (Fig. 1) and to raise reed spring 111 to withdraw pins 112 and 113 from the tape. During this interval, cam 129 (Fig. 13) has moved from point 163 to 164 to raise (through arm 121) pin 119 a slight distance in cam groove 115 in arm 114, but not yet sufficient to impart leftward movement to arm 114. Thereafter, arm 114 remains in its upward position while cam 127 continues its rotation, due to the dwell on said cam represented by that portion between points 162 and 165. During this latter interval, cam 129 operates between points 164 and approximately 166 to raise pin 119 upwardly, which operates in cam groove 115 to actuate arm 114 leftwardly to move the tape 51 forwardly (leftward, as viewed in Fig. 11). Then, as cam 127 completes its half revolution indicative of a cycle of operation, a drop-off on the periphery of the cam is encountered at 165 by follower lever 148 to effect a downward movement of arm 114 and a consequent withdrawal of pins 116, 117, and 118 from the tape 51. Finally, shortly after said withdrawal has been effected, arm 149 encounters the drop-off on the periphery of cam 129 at 166 to cause the downward movement of pin 119, which, coacting with cam groove 115, causes arm 114 to move rightwardly to return to its normal downward and rightward position, as shown in Fig. 11. Thus it is seen how, through the instrumentality of cams 127 and 129 the rectilinear feed action is accomplished to effect the forward motion of the tape 51.

According to the present invention, the backward spacing of the tape is also accomplished with the present rectilinear feed mechanism. As previously described, a bar 142 (Figs. 1 and 4) is provided for shifting the cam sleeve 123 to produce back spacing. When bar 142 is pressed inwardly (rightwardly as shown in Fig. 4), the cam sleeve 123 is moved rightwardly (which is permitted by the clearance between the cams and the arms 148 and 149 as shown in Figs. 12 and 13). By this action, cams 126 and 128 are brought into register with follower arms 148 and 149 of the rectilinear feed elements 114 and 121, respectively. In producing or effecting the back spacing operation, the rectilinear feed element 114 still rests in its normal rightward and downward position as shown in Fig. 11. However, for back spacing, the arm 114 is caused to move, first, leftwardly while in its lower position, then upwardly, then rightwardly while in its upper position, then downwardly to its normal downward and rightward positions as shown in Fig. 11. To produce this result, the cam contours of the peripheries of cams 126 and 128 are so conformed as to time this operation.

Specifically, starting from the normal position of arm 114, which is the downward and rightward position as shown in Fig. 11, arm 114 is moved for backward spacing, first to the left by cam 128 (represented by that portion of the cam periphery between points 163 and 167). By this action, pin 119 has been raised in the cam groove 115, which camming action imparts leftward movement to member 114. During this interval, cam 126 has moved from point 161 to point 168. As seen in Fig. 12, the point on the cam between points 161 and 168 is a cam dwell, whereby no upward or downward movement is imparted to the arm 114, it being merely under the sole control of cam 128. Thereafter, as the cams continue to rotate, the member 114, having reached its extreme leftward position (as viewed in Fig. 11), is moved upwardly to bring the pins 116, 117, and 118 into register with the feed holes in the tape. This motion to member 114 is effected by the cam 126 between the points 168 and 169 thereof. During this interval, the cam 128 rotates without effect upon the lever arm 149 and rectilinear feed element 121 because of the dwell between points 167 and 171 on the cam periphery of cam 128.

Thereafter, the member 114 remains in its upward position in engagement with tape 51 due to the dwell between the points 169 and 172 on cam 126. Then, as cam 128 rotates, the portion thereof between point 171 and 173 governs the downward movement of arm 121, and hence pin 119, which coacting with the cam groove 115, causes the rectilinear feed member 114 to move rightwardly in its upward position to impart corresponding backward (rightward, Fig. 11) movement to the tape 51. Thus, as cam 126 completes its half revolution indicative of a cycle of operation, a drop-off on the cam is encountered at point 172 by follower 148 to effect the downward movement of member 114 and the consequent withdrawal of pins 116, 117, and 118 from the tape 51. Finally, shortly after said withdrawal has been effected arm 149 rides on the dwell of the cam 128 from point 173 to the normal stop position of the cam, thus causing no effect to the pin 119, whereupon the rectilinear feed member 114 is returned to its normal rightward and downward position as shown in Fig. 11. As shown in Fig. 1, the reed spring 111 is wide enough to accommodate the entire rightward and leftward extent of movement of the rectilinear feed member 114 so that it will be operative for both the forward and backward feeding operations of the rectilinear feed mechanism.

In effecting the back spacing operation, the arm or bar 142 is actuated as previously described, in a rightward direction, as viewed in Fig. 4, and after the cam sleeve 123 has been positioned for back spacing, it is understood that the keyboard mechanism will be operated either to produce all marking perforations in the tape simultaneously with the back spacing operation by operating the "Letters" key or by operating the "Blank" key so as to release the cam sleeve for operation through the clutch release mechanism 133 as previously described.

The pivoted punch unit 22 is shown in Fig. 1 in a vertical or intermediate position. However, in its extreme counterclockwise position (shown dotted at 174) the tape guideway is adapted to be contiguous to the corresponding tape guideway of the sensing portion of the transmitting unit 23. Perforator unit 22 is capable of rotating in a clockwise direction to its dotted position indicated 175, and when its extreme clockwise position has been reached, a loop of tape between the perforator unit 22 and the transmitting unit 23 will be formed provided the speed of operation of the perforator is greater than the speed of operation of the transmitting unit. Then, if the perforating operation ceases and transmission continues, the loop of tape will decrease in size, as it is taken up by the transmitter, until the tape becomes taut between the dotted position 175 and the transmitter 23, whereupon the perforator 22 will be drawn toward the transmitter 23 until perforator 22 assumes a position 174 contiguous to the transmitter 23 so that the last code combination perforated by the perforator 22 will be sensed and the corresponding signal transmitted. In moving to position 174, the movement of the perforator unit 22 will open a contact 176 (Figs. 1 and 15) in the circuit of the transmitter control magnet 234 to de-energize said magnet to stop transmission. Upon resumption of the perforating operation, the perforating unit 22 will be forced away from the transmitting unit 23 by the first tape stepping operation due to the rigidity of the short portion of tape obtaining between the perforator 22 and the transmitter 23.

The transmitting unit 23 comprises a sensing portion and a transmitting portion. In the embodiment shown in Fig. 1, the sensing portion is fixed and comprises a channel shaped frame member 181, supported at its lower end on a rod 182 mounted in a bracket 183 carried on the base portion 25 (Figs. 1 and 8). Frame 181 is supported at its upper end on a rod 184 also mounted in the bracket 183.

Carried on extensions 185 of member 181 is a plate 186, and adjacent the right-hand edge of said plate is a series of code apertures into which a corresponding series of tape sensing pins 187 is slidable. Mounted on plate 186 are tape guide plates 188 and 189. The lower plate 188 has its upper surface depressed or grooved to form a channel for the tape as it passes through the sensing unit 23. The opening thus provided between plates 188 and 189 is in alignment with the tape guideway of the perforating unit 22. Code apertures are also provided in plates 188 and 189 in vertical alignment with the code apertures in plate 186. As illustrated in Figs. 1 and 8, there is carried on shaft 184, a sleeve 191 having integrally associated therewith a feed ratchet wheel 192 and a tape feed wheel 193. The wheel 193 is located in cooperative relation with the row of feed holes in the tape 51. A detent roller 194 is carried on a reed 195 attached to member 181 and cooperates with feed ratchet 192 in well-known manner.

Cooperating with ratchet wheel 192 is a feed pawl 196 (Figs. 1 and 8) which is pivotally attached to the horizontal arm of a bell crank lever 197 mounted on a pivot shaft 198. The depending arm 199 of lever 197 cooperates with a tape feed cam 201 (Fig. 3) integral with a cam sleeve 202 operatively associated with the transmitting shaft 203. Pawl 196 is normally biased into engagement with ratchet 192 by a spring 200.

The sensing elements or pins 187 are integral individually with a corresponding series of sensing fingers 204. The lower end of sensing fingers 204 are provided with open ended slots to straddle the shaft 182, whereby the sensing finger 204 is guided for vertical reciprocation. The sensing fingers 204 are also slotted in the side thereof to accommodate the ends of the horizontal arms of a series of bell crank levers 205, one individual to each sensing finger. Each of the bell crank levers 205 is provided with a depending arm 206 which cooperates with the horizontal arm 207 of a bell crank lever 208 (Fig. 1). Fastened near the end of each arm 206 of each bell crank lever 205 is a retractile spring 209, which serves to rotate its respective bell crank in a counterclockwise direction (as viewed in Fig. 1) and to move the associated sensing finger 204 vertically to cause the sensing elements 187 to sense the perforations in the tape 51. If a perforation is presented above a sensing element 187, the sensing finger moves vertically to its fullest extent, whereas if there is no perforation in vertical alignment therewith, its upward movement is correspondingly restricted. The depending arms 206 of the bell crank levers 205 cooperate with the slot in a pivotally mounted guide comb 211. Guide comb 211 is normally under the tension of a spring 212, one end of which is fastened to a spring post 213 and the other secured to ears 214 (Figs. 1 and 3). Stop screws 215 are provided in ears 214 to adjust the movement of comb 211. Depending from the pivot shaft 198 is an arm 216, the lower extremity of which fits into a slot in the comb member 211. Arm 216 is also provided with a cam follower projection 217 which cooperates with a cam 218 integral with the cam sleeve 202 (Fig. 3).

Comb member 211 is normally biased in a clockwise direction by springs 212 which, acting through arm 216, hold cam follower 217 against the periphery of cam 218. Comb member 211 also acts under the tension of springs 212 to hold bell crank levers 205 in their clockwise position (shown in Fig. 1) in blocking relation with arm 207 of transmitting levers 208, tensioning springs 209. Upon the rotation of cam 218, the apex thereof (not shown) coacts with a follower 217 to impart counterclockwise rotation to arm 216, which in turn imparts like rotation to comb 211. When comb 211 is thus rotated, the bell crank levers 205 are thereafter free to rotate in a counterclockwise direction, also, under the influence of their respective springs 209. However, whether or not the bell cranks 205 will thus respond to the pull of their springs 209, will depend upon whether an obstruction is encountered by the tape sensing elements 187. That is, if a perforation appears in the tape above a sensing element 187, that sensing finger 204 will be permitted to rise into the code perforation, thus permitting the bell crank lever 205 to rotate a predetermined amount under the influence of its spring 209 so that the depending arm 206 is moved out of blocking relation with arm 207 of the transmitting lever 208. On the other hand, if no perforation is in register with the tape sensing finger 204, that bell crank lever 205 associated therewith will not be permitted to rotate, and hence the depending arm 206 thereof will remain in blocking relation with an associated arm 207.

As previously mentioned, there is individual to each of the bell crank levers 205 a bell crank lever 208, pivoted on a shaft 221 and held in proper spaced position by spacing washers. Each bell crank 208 has a hook 222 at its upper end which engages the insulated upper end of the spring contact 223, and each of the latter cooperates with a contact spring 224, the pairs of contact springs being mounted upon, but insulated from, a supporting bar 225 carried by the transmitter bracket 226, mounted on the base 25.

Each spring contact 223 tends to engage its associated contact spring 224, and also serves to hold a lug 227 on the horizontal arm 207 of the corresponding bell crank lever 208 (when free to rotate counterclockwise) in engagement with the surface of an associated transmitting cam 228. Each of the cams 228 is provided with a recess 229, so that as the recess passes over the lug 227 the associated switch contacts 223 and 224 will be closed, provided the horizontal arm of the bell crank lever 208 is not restricted in its movement by the blocking arm 206. The cams 228 are so mounted on the shaft 203 that the recesses 229 are arranged in a helical series, so that as the cam sleeve 202 is rotated, the lugs 227 and recesses 229 cooperate successively to cause the contact 223 and 224 to close sequentially.

Figure 15:
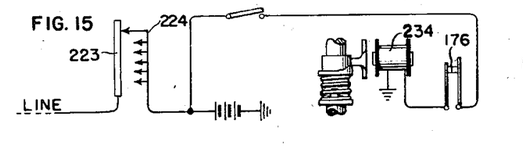
Fig. 15 is a circuit diagram of the electrical connections for the apparatus disclosed in Fig. 1.

Power is communicated to shaft 202 by the motor 81 which, as previously described, drives the cross shaft 74 through gears 77 and 78. Shaft 74 carries a pinion gear 229 which meshes with a gear 231, fixed to the transmitting shaft 203. Gear 231 drives cam sleeve 202 through a positive clutch, indicated generally as 233, which is described in detail in the afore-mentioned Lake Patent No. 2,262,012, and to which patent reference may be had for a complete disclosure of this clutch arrangement. As mentioned in the latter patent, this clutch is of the single revolution type and is controlled by an electromagnet 234. As shown in Fig. 15, the winding of the clutch control magnet 234 is in series with the contact 176 controlled by the pivoted perforator 22, so that when the contacts 176 are closed, which occurs during the operative period of the perforator 22, the magnet 234 will be energized to attract its armature to withdraw the clutch arm from the driven portion of the single revolution clutch 233, whereby the driven portion will be urged toward the driving portion to effect the rotation of the sleeve 202. Conversely, when the perforator 22 has ceased operating and has been advanced to the point 174 contiguous to the transmitting portion 23, contact 176 will be opened and the clutch release magnet 234 will be de-energized thereby releasing its armature and effecting the withdrawal of the driven portion of the clutch 233 from the driving portion in the manner described in the afore-mentioned Lake Patent No. 2,262,012.

General operation

Referring to Fig. 1, let it be assumed that all of the code combinations previously perforated in the tape 51 have been transmitted and that the perforating unit 22 has been moved to the position shown in dotted lines at 174, where the tape exit channel of the perforator is immediately adjacent to the entrance channel of the transmitter unit 23. Under such circumstances, contact 176 is opened and electromagnet 234 is de-energized, which results in the arrestment of cam sleeve 202. Also, the clutch controlled by the clutch release mechanism 133 for operating the shaft 43 of the perforating unit is also in its rest position preparatory to being released by the depression of a key lever 26. The condition of the feed hole punch unit 21 is such that the shaft 71 is constantly rotating, thereby reciprocating the bar 66 to produce feed perforations in the tape until a loop of tape has been formed whereby the lever 95 is rotated to its counterclockwise position blocking further movement of the bar 59. Upon the operation of a key lever 26, the punch interponents 35 are set in a characteristic code combination corresponding to the particular key lever depressed. Also, the clutch release mechanism 133 is operated to initiate one-half revolution of the cam sleeve 123 for the performance of one cycle of operation of the perforator 22. In response to the rotation of cam sleeve 123 the perforator punch hammer 36 is operated by the mechanism shown in Fig. 14 to produce the perforations in the tape. Thereafter the rectilinear feed mechanism is operated, as previously described, to step the tape forward one step. In so doing the tape causes the perforator unit 22 to be pushed away from the transmitting unit 23 and to close the contact 176. Then, the magnet 234 will become energized and the clutch 233 will become engaged to initiate the rotation of the transmitting cam sleeve 202, whereupon the sensing fingers 204 will be operated to sense the tape and to set the bell crank levers 205 in positions determined by whether the sensing fingers find a perforation in the tape or not, thus setting the arm 206 in blocking or nonblocking relation with the arms 207 of the transmitting levers 208. Then, as the cam sleeve 202 rotates, the contacts 223 will be operated successively to transmit a series of signals over the line (Fig. 15) corresponding to the particular code combination sensed in the tape.

It is understood that as soon as a row of perforations is perforated in the tape as the perforator assumes the dotted line position 174, it is immediately sensed by the sensing fingers 204 after the tape has been advanced one character space, since it is an object of the invention to transmit the last signal perforated in the tape. Since the perforator 22 operates at a greater speed than the speed of transmission, the perforator 22 will advance toward the right or pivot to the position shown at 175, whereafter, a loop of tape will be formed so that upon cessation of operation of the perforator, the transmitter will continue to operate until the pivoted perforator unit 22 has been pulled up to the transmitting unit 23 to transmit the last character perforated in the tape, whereupon the contact 176 will be opened to effect the de-energization of the magnet 234 to stop transmission.

Modification

In the embodiment of the invention already described, the transmitting unit has been illustrated as being fixed. Of course, it is contemplated that a pivoted transmitter such as shown in the Lake Patent No. 2,262,012 may be substituted for the fixed transmitting unit shown in Fig. 1. Accordingly, in Fig. 2 is shown this combination, wherein a pivoted transmitter unit is employed in conjunction with the pivoted perforating unit 22 of the present invention.

In the event that the pivoted transmitter, as shown in said Lake patent, is substituted for the fixed transmitter or sensing unit 23, the pivoted unit is caused to be so mounted as to pivot about the point of articulation between the horizontal arm of the bell crank 205 and the sensing fingers 204 (which compares with the point of connection between the sensing fingers 125 and bell crank horizontal arms 166 shown in Fig. 1 of said Lake patent). The rectilinear feed mechanism for the transmitting unit will be as shown in said Lake patent in Figs. 9 to 12 thereof, and operating cams for this rectilinear feed movement will be added to the cam sleeve 202 in proper position in correspondence with similar positions shown in the Lake patent.

While the invention has been disclosed and described with reference to a particular type of apparatus, it is obvious that it may be applied to other forms of apparatus without departing from the spirit and scope of the present invention. It is accordingly intended to cover all applications of the present invention which come within the purview of the appended claims.

What is claimed is:

1. A perforating device comprising a plurality of punch elements for punching control indicia in a strip, means for advancing said strip as an incident to the punching operation including a unitary member engaging said strip, rotary means for positively operating said unitary member rectilinearly, means to engage said strip and hold it temporarily against displacement during a portion of the rectilinear operation of said unitary member, and means to shift said rotary means to cause said unitary member to be operated in a reverse manner to impart reverse movement to said strip.

2. A perforator comprising a plurality of elements for perforating transverse rows of control indicia in a strip, a series of interponents, means for governing the permutable setting of said interponents, a cyclically operated perforating means cooperating with said elements for perforating transverse rows of permutation code indicia in said strip as determined by the operation of said interponents, unidirectional means rotated in a continuous motion in timed relation with respect to said cyclically operated perforating means, means for advancing said strip in uniform incremental amounts to present an unperforated area to said punch elements including a unitary member engaging said strip, and means rotated by said unidirectional means for operating said unitary member rectilinearly.

3. A perforator comprising a plurality of punch elements for perforating control indicia in a strip, a series of punch interponents, a cyclically operated perforating means cooperating with said interponents for perforating said indicia as determined by the operation of said interponents, means rotated in timed relation with respect to said cyclically operated perforating means, means for advancing said strip to present an unperforated area to said punch elements including a unitary member engaging said strip, means rotated by the means operated in timed relation with said cyclically operated means for operating said unitary member rectilinearly, and means for causing said rotated means to operate said unitary member in a reverse rectilinear manner to back space said strip.

4. A perforating device comprising a plurality of punch elements for punching control indicia in a strip, mechanism for advancing said strip as an incident to the punching operation including a unitary member engaging said strip, means for facilitating the repeated operation of said advancing means, rotary means for positively operating said unitary member rectilinearly, means to engage said strip and hold it temporarily against displacement during a portion of the rectilinear operation of said unitary member, means to shift said rotary means to cause said unitary member to be operated in a reverse manner to impart reverse movement to said strip, and means for operating said first recited means in a manner to effect repeated reverse stepwise movement of said strip.

5. A perforator comprising a plurality of elements for perforating control indicia in a strip, a series of interponents, a cyclically operated perforating means cooperating with said elements for perforating indicia in said strip as determined by the operation of said interponents, means rotated in timed relation with respect to said cyclically operated perforating means, means for advancing said strip to present an unperforated area to said punch elements including a unitary member engaging said strip, means rotated by the means operated in timed relation with said cyclically operated means for operating said unitary member rectilinearly, and single means dually effective on said cyclically operated means to effectuate selectively the operation of said advancing means in either direction.

6. A perforator comprising a plurality of punch elements for perforating control indicia in a strip, a series of punch interponents, a cyclically operated perforating means cooperating with said interponents for perforating said indicia as determined by the operation of said interponents, means rotated in timed relation with respect to said cyclically operated perforating means, means for advancing said strip to present an unperforated area to said punch elements including a member engaging said strip, means rotated by the means operated in timed relation with said cyclically operated means for operating said member rectilinearly, means for causing said rotated means to operate said member in a reverse rectilinear manner to back space said strip, and means for facilitating the repeated operation of said member when under the control of said rotated means.

7. A perforating device comprising a plurality of punch elements for punching control indicia in a strip, mechanism for advancing said strip as an incident to the punching operation including a member engaging said strip, means for facilitating the repeated operation of said advancing means, rotary means for positively operating said member rectilinearly, means to engage said strip and hold it temporarily against displacement during a portion of the rectilinear operation of said member, means to shift said rotary means to cause said member to be operated in a reverse manner to impart reverse movement to said strip, means for operating said first recited means in a manner to effect repeated reverse stepwise movement of said strip, and means to limit the operation of said last recited means.

8. In a perforating device, feed mechanism comprising a member for advancing a control strip as an incident to the punching operation, means for facilitating the repeated operation of said advancing means, rotary means for positively operating said member rectilinearly, means to shift said rotary means to cause said member to be operated in a reverse manner to impart reverse movement to said strip, means for operating said first recited means in a manner to effect repeated reverse stepwise movement of said strip, and means to automatically arrest the operation of said last recited means.

9. A perforating device comprising a pivoted punch head, a plurality of punch elements in said punch head for punching control indicia in a strip, means for rendering said pivoted punch head movable along a tape including a unitary member engaging said strip, rotary means for positively operating said unitary member rectilinearly, and means to alter said rotary means to cause said unitary member to be operated in a reverse manner to impart reverse movement to said strip.

10. In a perforating device, a pivoted punch head, feed mechanism in said punch head comprising a unitary member for advancing a control strip as an incident to the punching operation, means for facilitating the repeated operation of said advancing means, rotary means for positively operating said unitary member rectilinearly, means to shift said rotary means to cause said unitary member to be operated in a reverse manner to impart reverse movement to said strip, means for operating said first recited means in a manner to effect repeated reverse stepwise movement of said strip, and means to automatically arrest the operation of said last recited means.

ROSS A. LAKE.